Jan. 7, 1969  H. E. MARTIN  3,420,029

PREFABRICATED PANEL UNIT

Filed Sept. 19, 1966  Sheet 1 of 2

INVENTOR.
HAROLD E. MARTIN
BY
Harry B Keck
ATTORNEY

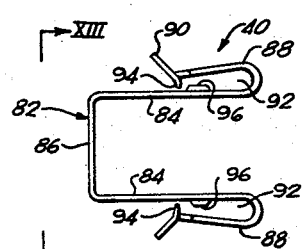
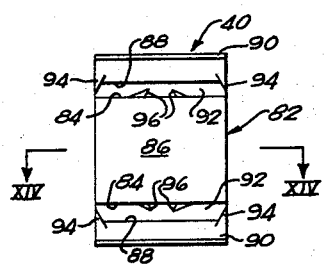
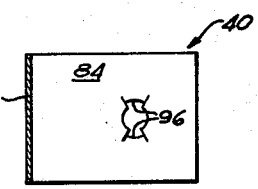
Fig. 12    Fig. 13    Fig. 14
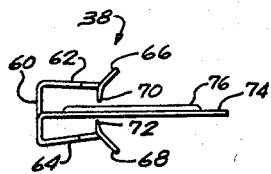
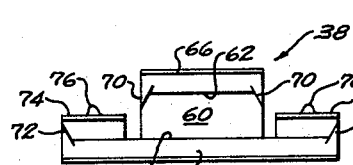
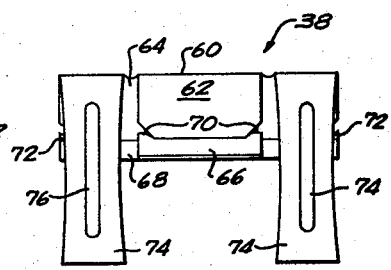
Fig. 9    Fig. 10    Fig. 11
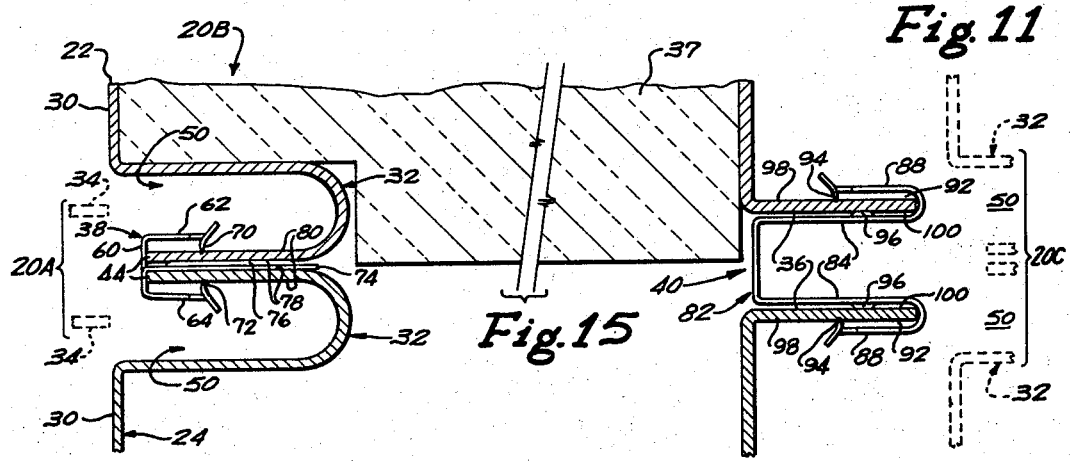
Fig. 15
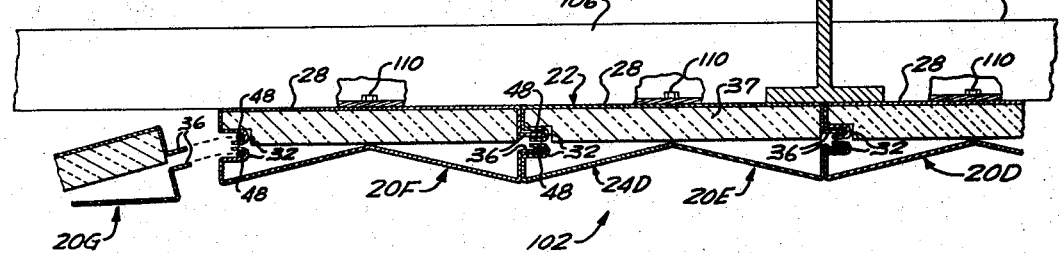
Fig. 16
INVENTOR.
HAROLD E. MARTIN
BY
ATTORNEY United States Patent Office 3,420,029
Patented Jan. 7, 1969

3,420,029
PREFABRICATED PANEL UNIT
Harold E. Martin, Connersville, Ind., assignor to H. H. Robertson Company, Pittsburgh, Pa., a corporation of Pennsylvania
Filed Sept. 19, 1966, Ser. No. 580,416
U.S. Cl. 52—594   11 Claims
Int. Cl. E04c *1/30;* E04c *2/38*

ABSTRACT OF THE DISCLOSURE

A unitary, high strength panel unit comprising a pair of facing sheets, each sheet having a male lip and a female lip formed along opposite sides of the facing sheet. The facing sheets are assembled in male lip-to-male lip and female lip-to-female correspondence. Connecting means, such as spring steel clips, are employed to secure the opposing male lips together and to secure the opposing female lips together. The unitary, high-strength panel presents a pair of female lips on one side positioned to receive a pair of male lips of an adjacent wall panel, and a pair of male lips on the opposite side positioned to be inserted into the female lips of an adjacent panel unit.

---

This invention relates to walls formed from individual panel units, and more particularly to improvements in prefabricated panel units of the interlocking type which are erected in side-by-side abutting relation to form such walls.

There are numerous panel units disclosed in the prior art which are erected in side-by-side relation to form a wall. These panel units may be used, for example, to form the exterior wall of a building, interior walls which divide the interior of a building into rooms and corridors, as well as temporary partitions which further subdivide new or existing rooms.

A number of these panel units are formed from two separate facing sheets. See, for example, U.S. Patents Nos. 2,644,552 and 3,048,244. These two exemplary panel units, as well as many others, employ facing sheets having specially designed profiles which adapt the facing sheets when assembled into a panel unit, for interlocking connection with adjacent panel units.

Objects

As an overall object, the present invention seeks to provide an improved panel unit of the prefabricated type.

A further object of the present invention is to provide improved panel units which may be erected in side-by-side abutting relation to form the exterior wall of a building; the interior walls which divide the interior of the building into rooms and corridors; and as temporary partitions which further subdivide existing rooms.

Another object of the present invention is to provide an improved panel unit formed from two facing sheets either or both of which may have similar or dissimilar profiles.

Yet another object of the present invention is to provide novel fastener clips for connecting the facing sheets to form the panel unit of the present invention.

A further object of the present invention is to provide a panel unit which is relatively inexpensive to manufacture and which may be erected in substantially less time than similar field assembled, double metal sheath, wall structures.

Summary of the invention

In accordance with the present invention, a prefabricated wall panel is provided, comprising a pair of facing sheets each of which includes a central web having opposite first and second longitudinal sides. A female lip is formed along the first longitudinal side and a male lip is formed along the opposite or second longitudinal side. The facing sheets are assembled in male lip-to-male lip and female lip-to-female lip correspondence. That is to say, the male lip of the first facing sheet is positioned adjacent the male lip of a second facing sheet while the female lip of the first sheet is positioned adjacent the female lip of a second sheet. First connecting means is provided for connecting the first longitudinal sides of the facing sheets with the female lips in closely adjacent relation. Second connecting means is provided for connecting the second longitudinal sides of the facing sheets with the male lips in spaced-apart relation. The overall arrangement is such that the female lips provided on one longitudinal side of the wall panel and the male lips provided on the opposite longitudinal side of the wall panel are positioned, respectively, to engage corresponding male lips and female lips of adjacent ones of the panel units and provide connections therebetween.

Further in accordance with the present invention, the facing sheets may have similar or dissimilar profiles, as will hereinafter be described and illustrated. When assembled into the panel unit, the facing sheets are positioned on opposite sides of an imaginary bilateral plane extending longitudinally through the wall panel. The first connecting means maintains the female lips equidistantly spaced from the bilateral plane. Similarly, the second connecting means maintains the male lips equidistantly spaced from the bilateral plane. The male lips and the female lips are thus disposed in predetermined positions on opposite sides of the bilateral plane whereby adjacent panel units are interlocked when erected in side-by-side abutting relation to form a wall.

Still further in accordance with the present invention, the first and second connecting means each preferably comprises a clip formed from spring steel and shaped to rigidly connect corresponding portions of the female lips and of the male lips. Each of the fastener clips employs tangs which penetrate surfaces of the corresponding portions of the male lips and of the female lips and which are positioned to restrict disengagement of the fastener clip from the lips being connected and to restrict movement of the lips relative to each other. The overall arrangement is such that the fastener clips rigidly connect the facing sheets into a unitary, high strength panel unit.

The above and other objects and advantages of the present invention will become apparent from the following detailed description by reference to the accompanying drawings, in which.

Figure 8:
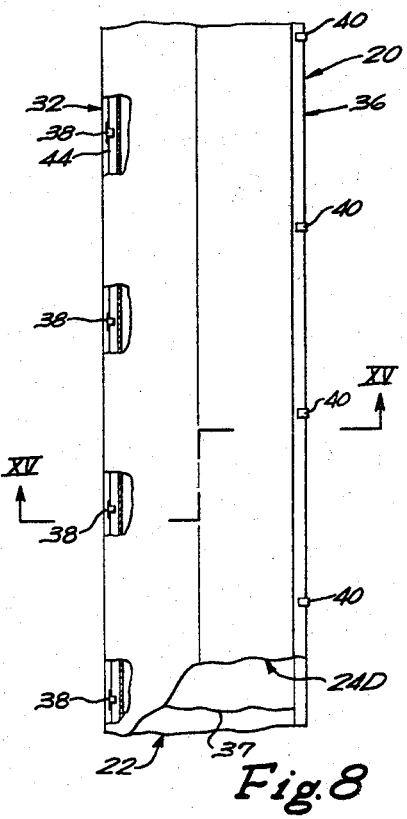

FIGS. 3–7, inclusive, are fragmentary isometric views illustrating facing sheets of different profiles, employed to form the panel unit of the present invention;

FIG. 8 is a fragmentary front view of the present panel unit illustrating the positions of a first and a second connecting means;

FIG. 9 is a side view of a fastener clip employed to connect the female lips;

FIG. 10 is a front view of the fastener clip of FIG. 9;

FIG. 11 is a plan view of the fastener clip of FIG. 9;

FIG. 12 is a side view of a fastener clip employed to connect the male lips;

FIG. 13 is an end view of the first fastener clip as viewed from the line XIII—XIII of FIG. 12;

FIG. 14 is a cross-sectional view taken along the line XIV—XIV of FIG. 13;

FIG. 15 is a fragmentary cross-sectional view, on an enlarged scale, taken along the line XV—XV of FIG. 8; and FIG. 16 is a transverse cross-sectional view of a typical wall structure assembled with the panel units of the present invention.

*Wall panel—General description*

Figure 1:
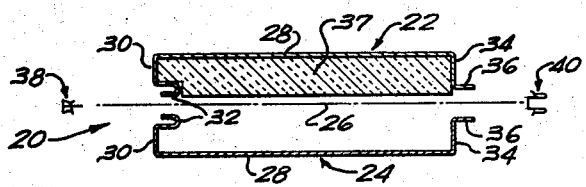
FIGURE 1 is a schematic exploded cross-sectional view of a panel unit formed in accordance with the present invention.

Reference is now directed to FIG. 1 wherein a wall panel 20 of the present invention is schematically illustrated for the purpose of identifying the component parts thereof. In general, the wall panel 20 includes an inner facing sheet 22 and an outer facing sheet 24 positioned on opposite sides of an imaginary bilateral plane indicated by the dash-dot line 26. Each of the facing sheets 22, 24 has a central web 28 including a first longitudinal side 30 provided with a female lip 32 and a second longitudinal side 34 provided with a male lip 36. The facing sheet 22 is provided with thermal insulation 37 to decrease heat transfer through the panel unit 20. The facing sheets 22, 24 are assembled in female lip-to-female lip and male lip-to-male lip correspondence, as illustrated in FIG. 1. A plurality of first connecting means 38 (only one shown) in employed to connect the first longitudinal sides 30 with the female lips 32 in closely adjacent relation. Likewise, a plurality of second connecting means 40 (only one shown) is employed to connected the second longitudinal sides 34 with the male lips 36 in spaced-apart relation.

*Lips 32, 36*

Figure 2:
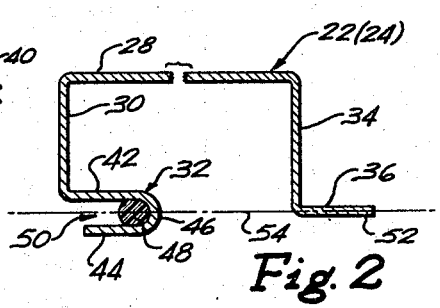
FIG. 2 is a cross-sectional view taken transversely through one of the facing sheets of FIG. 1, illustrating the relative positions of the male and female lips.

In FIG. 2, a facing sheet is designated 22(24) to indicate that it may comprise either the inner facing sheet 22 or the outer facing sheet 24. The following description is intended to apply to both of the facing sheets 22, 24.

The female lip 32 comprises an inner leg 42 which is connected along one edge to the first longitudinal side 30, an outer leg 44 which is spaced from the inner leg 42 and a bight 46 which connects adjacent edges of the inner and outer legs 42, 44. The outer leg 44 is substantially parallel to the inner leg 42 and has a width which is less than the width of the inner leg 42. The female lip 32 provides a groove 50 which extends longitudinally of the facing sheet 22(24) and which opens horizontally away from the second longitudinal side 34. Suitable caulking material 48 is placed within and extends along the entire length of the groove 50. The caulking material 48 is preferably applied in the shop during assembly of the present panel unit 20, although it may, if desired, be applied in the field prior to erecting the panel.

The male lip 36 comprises a marginal flange 52 connected along one edge to the second longitudinal side 34. The position of the marginal flange 52 relative to the female lip 32 is such that a plane indicated by the dash-dot line 54 extends through the marginal flange 52 and between the inner and outer legs 42, 44 of the female lip 32.

It is to be noted that both the inner and outer facing sheets 22, 24 have identical female lips 32 and identical male lips 36 and, consequently, the sheets may be interchanged without affecting the interlocking connection between adjacent ones of the panel units 20.

*Facing sheets*

As stated above, the inner and outer facing sheets 22 24 may have various profiles as will now be described in conjunction with FIGS. 3–7, inclusive. Corresponding numerals will be employed to identify corresponding parts heretofore described.

Figure 3:
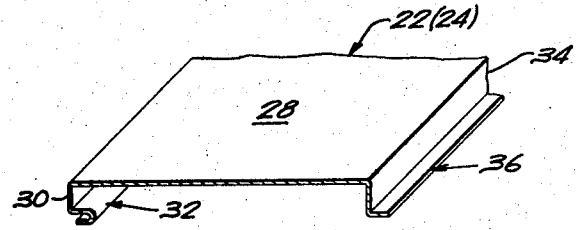
Figure 4:
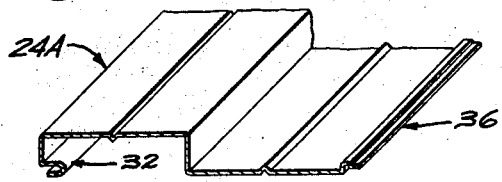
Figure 5:
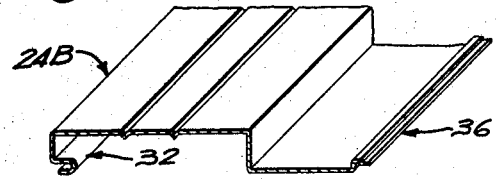
Figure 6:
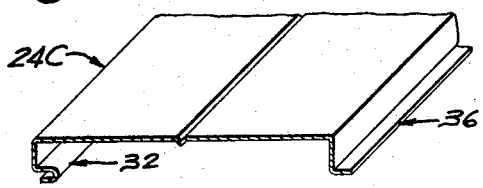
Figure 7:
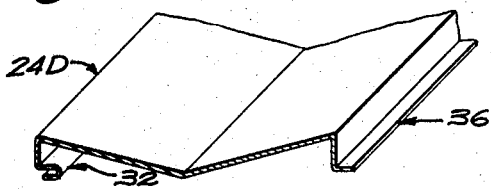

Referring now to FIG. 3, the inner facing sheet 22 is again illustrated in an isometric view to better show its configuration. The facing sheet 22 is preferably employed as the inner or liner sheet of the present panel unit 20. Its flat central web 28 provides a convenient surface through which fasteners may pass for securing the panel unit 20 to the structural steel of a building, for example. In FIG. 3, the facing sheet is labeled 22(24) to indicate that it may be used as both the inner and outer facing sheets of the panel unit 20 as shown in FIG. 1.

In FIGS. 4–7, inclusive, there are illustrated outer facing sheets 24A–24D, respectively, each having a different profile. Any one of the facing sheets 24A–24D may be employed as the outer facing sheet of the present panel unit 20. It is to be noted, however, that the profile of the outer facing sheet 24 is not limited to those profiles shown in FIGS. 4–7, inclusive, and that the outer facing sheet 24 may have any other suitable profile. The only requirement of the outer facing sheet is that it has the female lip 32 along one longitudinal edge and the male lip 36 along the opposite longitudinal edge.

It should be readily apparent that panel units 20 may be formed by combining two of the facing sheets 22 or one of the facing sheets 22 and any one of the outer facing sheets 24A–24D, to form panel units which when erected in side-by-side abutting relation form a wall. Furthermore, wall structures may be formed from panel units having different outer facing sheets, as desired.

*Typical panel unit 20*

Referring now to FIG. 8 there is shown a typical panel unit 20 formed from the inner facing sheet 22, thermal insulation 37 and the outer facing sheet 24D. A plurality of the first connecting means 38 is spaced along the female lips 32 and serves to connect the outer legs 44 of the female lips 32. Similarly, a plurality of the second connecting means 40 is spaced along and connects the male lips 36. It is to be noted that the first connecting means 38 are staggered with respect to the second connecting means 40 to prevent interference between, for example, the first connecting means 38 of the panel unit 20 with the second connecting means 40 of an adjacent panel unit. As will hereinafter be more fully explained, the first and second connecting means 38, 40 rigidly connect respectively the female lips 32 and the male lips 36. The arrangement is such that the inner facing sheet 22 and the outer facing sheet 24D are united into a rigid unitary structure capable of supporting a load and capable of being interlocked with adjacent ones of the panel units 20.

*First connecting means 38*

Referring now to FIGS. 9–11, inclusive, the first connecting means 38 preferably comprises a fastener clip formed from spring steel and including a web 60 having arms 62, 64 projecting forwardly thereof and terminating in outturned flanges 66, 68, respectively. The arms, 62, 64 are inclined relative to the web 60 such that they converge toward each other. Tangs 70, one provided at each end of the outturned flanges 66, extend inwardly toward the arm 64. Tangs 72, one at each end of the outturned flanges 68, extend inwardly toward the arm 62. The fastener clip is also provided with tongues 74, one at each end of the web 60, which project forwardly of the web 60 and are positioned centrally between the tangs 70, 72. Each of the tongues 74 is preferably provided with a rib 76 which projects upwardly from the tongues 74 toward the tangs 70.

Referring now to FIG. 15, there is illustrated a panel unit 20B formed from the inner facing sheet 22 having the insulation 37 and the outer facing sheet 24. Installation of one of the first connecting means 38 is accomplished by inserting the tongues 74 between the outer legs 44 and moving the first connecting means 38 inwardly until the ends of the outer legs 44 engage the web 60. In this position, the tongues 74 and ribs 76 engage adjacent confronting surfaces 78 of the outer legs 44 while the tangs 70, 72 penetrate and frictionally engage the hidden surfaces 80 of the outer legs 44. The arms 62, 64 become deflected outwardly and their tendency to return to their normal inclined position, causes the tangs 70, 72 to be embedded and frictionally engaged with the hidden surfaces 80. Consequently, the overall arrangement is such that the embedment of the tangs 70, 72 in the hidden surfaces 80 prevents the first connecting means 38 from being disconnected from the female lips 32 as well as preventing movement of the female lips 32 relative to each other. The first connecting means 38 also maintains the female lips 32 positioned to receive the male lips 36 of an adjacent panel unit 20A, shown here in dotted outline.

*Second connecting means 40*

Referring now to FIGS. 12–14, inclusive, the second connecting means 40 preferably comprises a clip formed from spring steel. The second connecting means 40 includes a channel-like body 82 including sides 84 and a base 86 connecting corresponding ends of the sides 84. A reverse turned flange 88 is provided at the opposite end of each of the sides 84 and terminates in an outturned flange 90. The reverse turned flanges 88 and the adjacent sides 84 cooperate to define grooves 92 adapted to receive the male lips 36 of the inner and outer facing sheets 22, 24, as will be described in conjunction with FIG. 15. At each end of the outturned flanges 90 there is provided a tang 94 which projects toward the side 84 to constrict the groove 92. The reverse turned flanges 88 are inclined and converge toward the associated side 84. Cooperating with the tangs 94 are additional tangs 96 which are formed in the sides 84 and project toward the reverse turned flanges 88.

Referring now to FIG. 15, the installation of the second connecting means is accomplished by introducing the male lips 36 of the panel unit 20B into the grooves 92. The channel-like body 82 maintains the male lips 36 in spaced-apart relation such that the male lips 36 will be received in the grooves 50 provided by the female lips 32 of an adjacent panel unit 20C, shown here in dotted outline. Inasmuch as the reverse turned flanges 88 are inclined relative to the sides 84, introduction of the male lips 36 into the grooves 92 causes the reverse turned flanges 88 to be deflected outwardly. The tendency of the reverse turned flanges 88 to return to their normal inclined position embeds and frictionally engages the tangs 94 in surfaces 98 of the female lips 32. Similarly, the tangs 96 penetrate and frictionally engage spaced inner surfaces 100 of the female lips 32. It should be readily apparent that the tangs 94, 96 rigidly connect the second connecting means 40 to the male lips 36 to prevent the second connecting means 40 from being disengaged from the male lips 36 and, furthermore, to restrict movement of the male lips 36 relative to each other.

*Typical wall structure*

Reference is now directed to FIG. 16 wherein there is illustrated a typical wall structure 102 formed from the present panel units and shown erected on a structural framework 104 of a building. As is conventional, the structural framework 104 includes girts 106 and columns 108 (only one shown).

The typical wall structure 102 comprises a plurality of the present panel units designated herein by 20D, 20E, 20F and 20G. Each of the panel units 20D–20G is formed from one of the inner facing sheets 22 including the thermal insulation 37 and one of the outer facing sheets 24D. The inner and outer facing sheets 22, 24D are connected by the first and second connecting means 38, 40 (not shown here) in the manner described hereinabove. The panel units 20D–20G are shown here with the outer facing sheet 24D solely for the purpose of illustration. Alternatively, the panel units 20D–20G could, instead, have as the outer facing sheet, any of the facing sheets 22 or 24A–24C.

The panel units 20D–20F have been erected in side-by-side abutting relation and secured to the structural framework 104, for example, by means of fasteners 110 passing through the girts 106 and into the central webs 28. It will also be noted that the male lips 36 are positioned within the female lips 32 and penetrate the caulking material 48 provided in the female lips 32, to provide an effective seal against ingress of dust, moisture and the like.

The panel unit 20G is shown in a position preparatory to being interlocked with the panel unit 20F. The male lips 36 of the panel unit 20G will enter the female lips 32 of the panel unit 20F and be embedded in the caulking material 48.

The present panel units are erected in a simple, rapid and efficient manner. For example, the first panel unit 20D need only be placed in a vertical position and secured to the structural framework 104 by means of the fasteners 110. The next panel unit 20E is placed vertically in engagement with the structural framework 104 and slid toward the panel unit 20D until the male lips 36 enter the female lips 32 and embed themselves in the caulking material 48. Penetration of the male lips 36 into the caulking material 48 automatically provides a double vapor barrier to prevent the ingress of wind, dust and the like, into the interior of the building. Thereafter, additional fasteners 110 are used to secure the panel unit 20E to the structural framework 104. This procedure is repeated for additional ones of the panel units until the entire wall structure 102 has been erected.

*Summary*

The present invention provides an improved prefabricated panel unit which is formed from two facing sheets which may have similar or dissimilar profiles. The present panel units may be erected to form the exterior wall of a building; the interior walls which divide the interior space of a building into rooms and corridors; and as temporary partitions which further subdivide existing rooms. The present invention also provides novel fastener clips for rigidly connecting the pair of facing sheets to form the panel unit of the present invention. Furthermore, the present prefabricated panel units may be erected rapidly.

I claim as my invention:
1. A prefabricated wall panel comprising:
   a pair of facing sheets, each of said facing sheets comprising a central web having opposite first and second longitudinal sides, a female lip formed along said first longitudinal side, and a male lip formed along said second longitudinal side, said facing sheets being assembled in male lip-to-male lip and female lip-to-female lip correspondence;
   first means for connecting said first longitudinal sides of said facing sheets with said female lips in adjacent relation; and
   second means for connecting said second longitudinal sides of said facing sheets with said male lips in spaced-apart relation;
   the said first means and the said second means rigidly connecting said pair of facing sheets into a unitary, high strength panel;
   the said female lips and the said male lips provided on the opposite first and second longitudinal sides of said wall panel being positioned, respectively, to engage corresponding male lips and female lips of adjacent ones of said wall panels to provide connections therebetween.

2. The prefabricated wall panel as defined in claim 1 wherein said facing sheets are positioned on opposite sides of an imaginary bilateral plane extending longitudinally through said wall panel, said male lips and said female lips being equidistantly spaced from said bilateral plane.

3. The prefabricated wall panel as defined in claim 1 wherein said first means for connecting and second means for connecting, respectively, engage directly said female lips and said male lips.

4. The prefabricated wall panel as defined in claim 1 wherein each of said female lips includes an inner leg connected along one edge to said first longitudinal side, an outer leg spaced from said first leg, and a bight connecting adjacent edges of said inner leg and said outer leg, the width of said outer leg being less than the width of said inner leg.

5. The prefabricated wall panel as defined in claim 1 wherein
said first connecting means comprising a plurality of clips spaced along and embracing said female lips.

6. The prefabricated wall panel as defined in claim 5 wherein said clips include tongues formed integrally therewith and projecting between and engaging both said female lips.

7. The prefabricated wall panel as defined in claim 1 wherein
said second connecting means comprises a plurality of clips spaced along and embracing said male lips.

8. The prefabricated wall panel defined in claim 5 wherein
said clips include tangs penetrating surfaces of both of said female lips and positioned to prevent disengagement of said clips from said female lips and to restrict movement of one said female lip relative to the other said female lip.

9. The prefabricated wall panel defined in claim 7 wherein
each of said clips has a channel-like body disposed between and engaging adjacent inner surfaces of said male lips to maintain said male lips in spaced-apart relation, and reverse turned flanges, one engaging an outer face of each of said male lips.

10. The prefabricated wall panel defined in claim 9 wherein
each of said clips includes a plurality of tangs penetrating at least one surface of each of said male lips and positioned to prevent disengagement of said clips from said male lips and to restrict movement of said male lips relative to each other.

11. The prefabricated wall panel defined in claim 1 including
thermal insulating material disposed between said pair of facing sheets.

References Cited

UNITED STATES PATENTS

| | | | |
|---|---|---|---|
| 2,628,078 | 2/1953 | Krauss | 52—593 X |
| 2,862,254 | 12/1958 | Meek | 52—580 X |
| 2,910,150 | 10/1959 | Roseman | 52—407 X |
| 3,224,155 | 12/1965 | Rook | 52—593 |

DAVID J. WILLIAMOWSKY, *Primary Examiner.*

DENNIS L. TAYLOR, *Assistant Examiner.*

U.S. Cl. X.R.

52—584, 619